S. A. CHERRY.
SPRING WHEEL.
APPLICATION FILED MAR. 6, 1916.
1,205,972.
Patented Nov. 28, 1916.
2 SHEETS—SHEET 1.
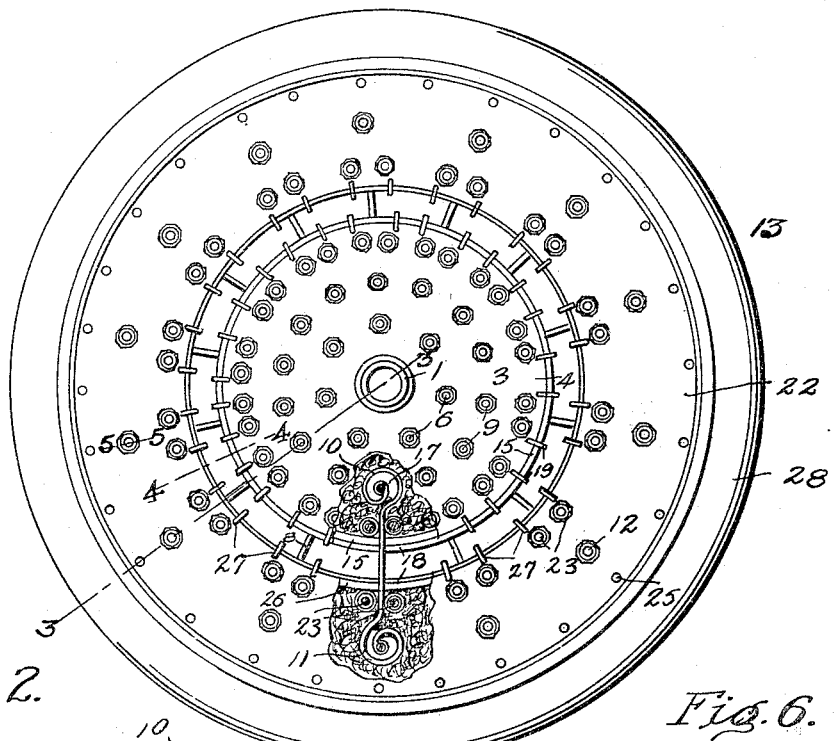
Fig. 1.
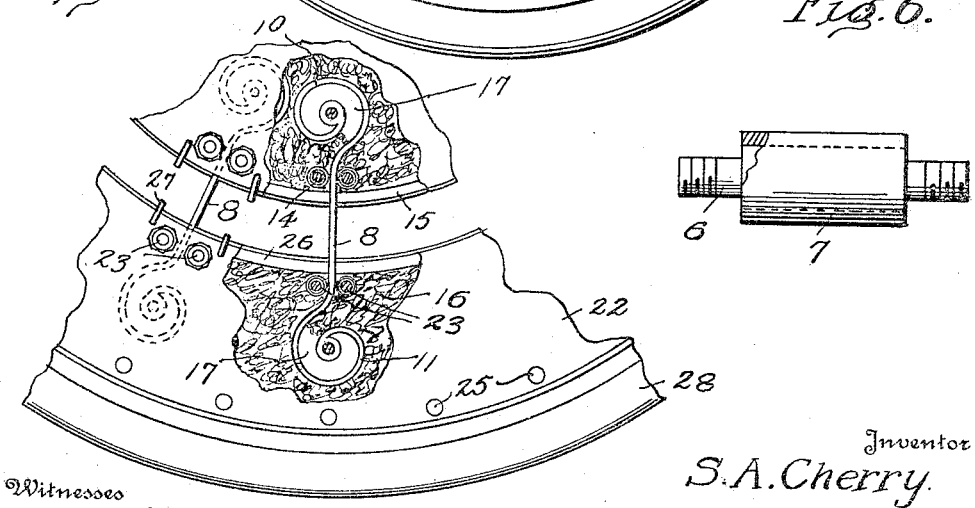
Fig. 2.
Fig. 6.
Witnesses
M. J. McDevitt
Chas. E. Smith
Inventor
S. A. Cherry
By G. E. Crosman & Co.,
his Attorneys

S. A. CHERRY.
SPRING WHEEL.
APPLICATION FILED MAR. 6, 1916.

1,205,972.

Patented Nov. 28, 1916.
2 SHEETS—SHEET 2.

Witnesses

Inventor
S. A. Cherry
By
his Attorneys

UNITED STATES PATENT OFFICE.

SPENCER A. CHERRY, OF NASHVILLE, TENNESSEE.

SPRING-WHEEL.

1,205,972.  Specification of Letters Patent.  Patented Nov. 28, 1916.

Application filed March 6, 1916. Serial No. 82,484.

*To all whom it may concern:*

Be it known that I, SPENCER A. CHERRY, a citizen of the United States of America, residing at Nashville, in the county of Davidson and State of Tennessee, have invented certain new and useful Improvements in Spring-Wheels, of which the following is a specification, reference being had therein to the accompanying drawing.

This invention relates to spring wheels and has for its object the production of a simple and efficient resilient wheel whereby the use of a pneumatic tire may be eliminated, and at the same time the wheel will maintain its resiliency to relieve the shock from the body of the motor car upon which the wheel is used.

Another object of this invention is the production of a simple and efficient means for securing the springs in engagement with the body of the wheel whereby the maximum amount of resiliency may be obtained.

With these and other objects in view this invention consists of certain novel combinations, constructions, and arrangements of parts as will be hereinafter fully described and claimed.

Figure 3:
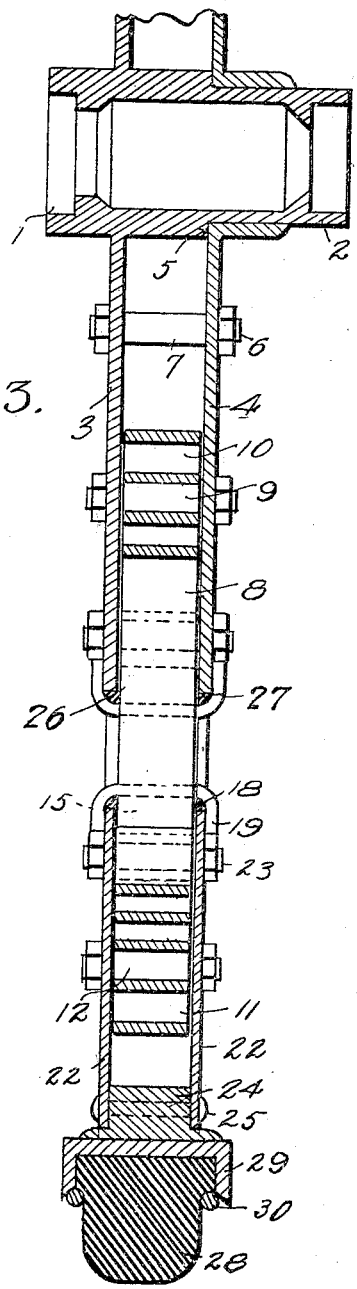
Figure 4:
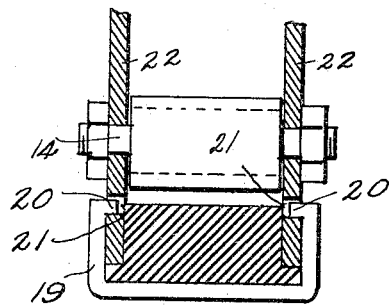
Figure 5:
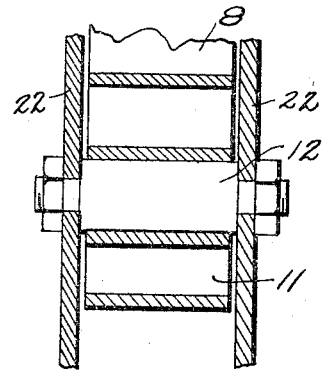

In the accompanying drawings:—Figure 1 is a side elevation of the wheel. Fig. 2 is an enlarged vertical section through the wheel showing an edge view of the springs employed in connection therewith. Fig. 3 is a section taken on line 3—3, of Fig. 1. Fig. 4 is a section taken on line 4—4, of Fig. 1. Fig. 5 is a section taken on line 5—5, of Fig. 1. Fig. 6 is a side elevation of one of the spacing bolts and sleeves used in connection with the present invention.

By referring to the drawings it will be seen that 1 designates the hub which is provided with a reduced extension 2 upon one side thereof. This hub 1, is provided with an integral laterally extending plate 3, and a detachable side plate 4 is fitted upon the reduced end 2 of the hub 1, and is adapted to bear against the shoulder 5 formed upon the hub 1. This structure is clearly illustrated in Fig. 3 of the drawings.

A plurality of spacing bolts 6 pass through the plates 3 and 4 and carry sleeves 7, which sleeves 7 are adapted to fit between the plates 3 and 4 and hold these plates in rigid spaced relation and prevent these plates from bearing severely upon the edges of the springs 8 as illustrated in Fig. 3. A plurality of spring supporting bolts 9 also pass through the plates 3 and 4, and the inner spiral ends 10 of the springs 8 engage these bolts 9. The opposite end, or as will be referred to hereinafter as the outer end 11 of the springs is secured to the bolts 12 carried by the outer section 13 of the wheel. A bolt 14 is placed upon each side of the spring 8 so as to prevent the shifting movement of the spring to any great extent and in this manner will relieve considerable pressure from the resilient plugs 15 which are carried around the periphery of the plates 3 and 4 and the inner face of the outer section 13 of the wheel.

A fibrous packing 16 is placed between the plates 3 and 4 and fits snugly around the inner spiral end 10 of the spring 8, and this fibrous packing 16 is adapted to be saturated with lubricant material for the purpose of allowing the free movement of the spring. This fibrous material 16, however, is arranged closely around the body of the spring, but a pocket 17 is left within the inner spiral end of the spring so as to allow the spiral end 10 of the spring to contract and expand without being interfered with by jamming the fibrous material which would take place providing the fibrous material extended between the convolutions of the spiral end 10. As above stated, a resilient plug 15 is interposed between each of the springs 8, and this plug 15 is provided with overhanging edges 18, which overhanging ends 18 engage the outer periphery of the plates 3 and 4. Securing links 19 pass over the resilient plugs 15 and efficiently hold these plugs in position, and these links 19 are provided with inwardly turned ends 20, which inwardly turned ends 20 fit in the sockets or apertures 21 formed in the plates 3 and 4.

An outer ring section 13 is formed upon the wheel and used in connection with the inner hub section of the wheel, and this outer ring section, or which will be referred to hereinafter as the rim section, comprises a pair of plates 22, which plates 22 are spaced by means of the bolts 23 and fit snugly around the felly plate 24 as illustrated clearly in Fig. 3. Each spring 8, as above stated, is provided with an outer spiral end 11 of similar construction to the spiral end 10, and is held in engagement between the plates by means of the bolts 25. The bolts 23 will perform the same function as the bolts 14 for holding the spring against wide movement adjacent the inner edge of the rim section 13. The inner edge of the rim section carries resilient plugs 26 similar to the plugs 15, and these plugs 26 are held in proper position upon the rim section by means of the links 27, which links 27 are similar to the links 19.

A resilient tire 28 is employed and carried by a rim 29, the metal bands 30 passing around the inner edge of the resilient tire 28 to facilitate the holding of the tire in engagement with the rim 29.

From the foregoing description it will be seen that a very simple and efficient construction has been produced for imparting resiliency to a wheel of metal construction without the necessity of employing a pneumatic tire, and it should be understood that all of the delicate parts which would be likely to take up the severest amount of strain are well protected within a casing to which no dust or other foreign substance can be admitted due to the construction of the sealing plugs 26 and 15. However, at the same time the mounting of these springs in the manner as above described and as illustrated will allow a free resilient movement of the wheel, and allow the spiral ends to perform their function without being jammed or their action being hampered in any way. At the same time the lubricating material held in several portions of the wheel will permit the free movement of the spiral springs.

Having thus described the invention what is claimed as new, is:—

1. A wheel of the class described comprising a hub section, said hub section comprising a plurality of spaced plates, spring members interposed between said spaced plates, means for securing the inner ends of said spring members in engagement with said plates, each spring member comprising a spiral end, means for limiting the forward and backward movement of said springs within said hub section, means for sealing the outer end of said hub section, lubricating means positioned between said plates and fitting around said spiral end of said spring for thoroughly lubricating the same while in action, a rim section engaging the opposite end of said spring, and said spring provided at each end with similarly constructed convolutions extending in opposite directions.

2. A spring wheel of the class described comprising a hub section, a rim section, springs interposed between said sections, each spring provided with a spiral end, the convolutions of one spiral end extending in an opposite direction to the other spiral end, a lubricated packing positioned around said spring and extending around the outer face of said convolutions, said convolutions provided with an open pocket upon the inner face thereof free from packing to facilitate the free expansion and contraction of said convolutions while the wheel is under pressure, a resilient sealing means for the outer edge of said hub section, a rim section, and means formed in said rim section similar to said hub section for holding said spring in engagement therewith.

In testimony whereof I hereunto affix my signature.

SPENCER A. CHERRY.

Copies of this patent may be obtained for five cents each, by addressing the "Commissioner of Patents, Washington, D. C."